X 5220E
(2)
March 18, 1969 F. K. BECKER 3,434,056
DISTORTION MONITORING BY COMPARING SQUARE AND CUBIC LAW DISTORTION TO CARRIER
Filed May 31, 1966
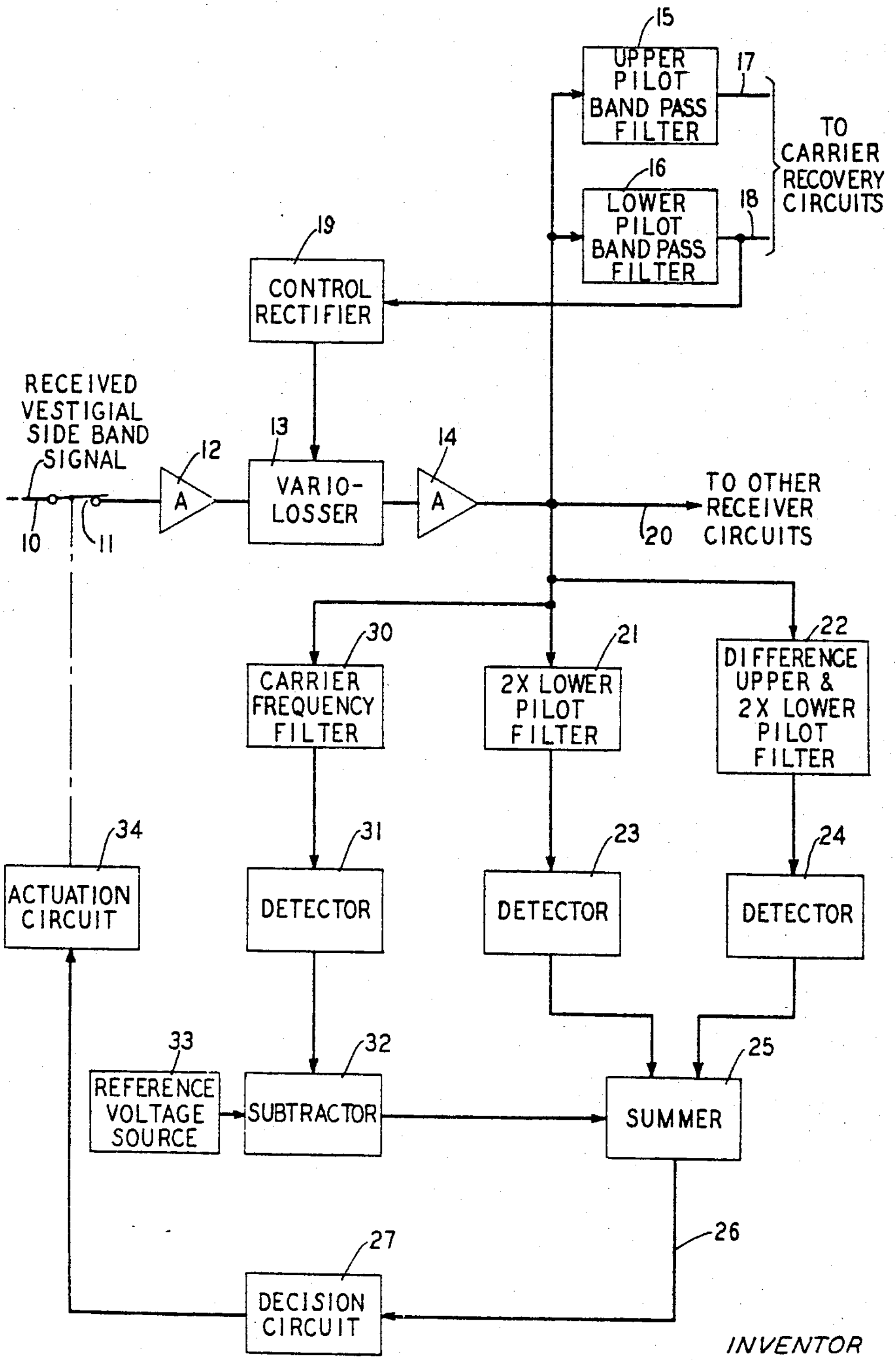
INVENTOR
F. K. BECKER
BY J. P. Kearns
ATTORNEY 3,434,056

DISTORTION MONITORING BY COMPARING SQUARE AND CUBIC LAW DISTORTION TO CARRIER

Floyd K. Becker, Colts Neck, N.J., assignor to Bell Telephone Laboratories, Incorporated, Murray Hill, N.J., a corporation of New York Filed May 31, 1966, Ser. No. 554,161
U.S. Cl. 325—65 7 Claims
Int. Cl. H04b *1/10, 15/02*

ABSTRACT OF THE DISCLOSURE

Nonlinear distortion monitoring apparatus is simply and economically provided in a receiver for a vestigial-sideband data transmission system to terminate data calls which would be excessively error-prone before a customer billing charge can be made. Nonlinear distortion of the square-law type is detected by monitoring the second harmonic content of one of two band-edge pilot tones accompanying the received signal and distortion of the cubic-law type, by monitoring the difference between one pilot tone frequency and twice that of the other. The carrier-frequency component transmitted during call set-up can also be monitored as a measure of the slope of the amplitude-frequency characteristic of the transmission channel. The monitoring apparatus controls a relay which opens the transmission path at the receiver as a signal to a switching center to terminate a potentially unintelligible data call before billing.

This invention relates generally to distortion detection in digital data transmission systems and specifically to the detection of nonlinear distortion in a public switched-telephone network data call in time to permit disconnection before the call is charged.

In the high speed data transmission systems disclosed in either of my copending patent applications Ser. No. 459,659, filed May 28, 1965 or Ser. No. 550,810, filed May 17, 1966 a serial data signal is converted into a multilevel format and amplitude modulated onto a carrier-frequency wave located in the telephone voice-frequency band. In order to conserve bandwidth only a single vestigial-sideband of the modulated signal is selected for transmission through the telephone network. Recovery of an accurately phased demodulating carrier wave at the receiving station is assured by the addition of band-edge pilot tones to the transmitted signal. These tones are related by their difference frequency to the suppressed carrier frequency, as well as to the data symbol timing rate. During message transmission no carrier frequency component is present unless the message data includes a direct-current component.

Switched telephone connections, involving as they do a plurality of types of baseband, carrier and radio channels, vary greatly from one call set-up to the next in the amount of nonlinear distortion generated.

The most disturbing classes of nonlinear distortion present in the telephone network due to the presence of nonlinear components such as varistors and diodes include square-law and cubic-law types. Square-law distortion results in the generation of second harmonics and sums and differences of all fundamental frequencies present. Cubic-law distortion produces third harmonic and second order difference frequencies of all fundamental frequencies present. In certain call connections digital data may become so distorted as to exceed the correction capabilities of even the automatic equalizer proposed for use with the illustrative vestigial-sideband data transmission system. In these extreme situations it would be desirable to be able to monitor transmission distortion at the receiving station and cause abandonment before the customer is charged for an error-prone call.

Accordingly, it is an object of this invention to obtain a measure of the nonlinear distortion generated in a transmission system handling digital data signals.

It is a further object of this invention to disconnect a receiving set from the line on detection of a distortion level exceeding a predetermined threshold before a customer charge is made.

It is another object of this invention to measure square-law and cubic-law distortion in a received data signal simply and economically.

According to this invention, these objects and others are attained by monitoring the second harmonic of one of the pilot-tone frequencies, the difference between one pilot-tone frequency and twice the other pilot-tone frequency and the carrier-frequency component. A carrier-frequency component of controlled level is purposely transmitted at the beginning of each call for phasing purposes. The level of the second harmonic of the one pilot tone serves as a measure of the square-law distortion within the data transmission band. The level of the difference frequency mentioned serves as a measure of the cubic-law distortion throughout the data band. The difference between the rectified level of the transmitted carrier-frequency component and a predetermined direct-current reference level is a further measure of the slope of the amplitude-frequency response curve of the transmission system. With all three of these distortion measures reduced to direct-current control voltages a threshold decision circuit is devised to determine whether the magnitude of the distortion is great enough to warrant abandoning the call. The decision circuit controls a switching circuit which can open the line to the receiver, thereby relaying an on-hook appearance to the telephone central office.

The three critical frequencies are detected with the aid of narrow bandpass filters and rectified to produce direct-current control voltages. These control voltages are combined in a linear adder and applied to a threshold decision circuit of any convenient design. The slope detector may be used either in combination with the square-law and cubic-law distortion detectors or as an alternative thereto in a practical system.

A feature of this invention is that nothing need be added to the transmitted signal to effect distortion detection. The pilot tones already present for automatic gain control purposes and carrier and timing recovery suffice for this purpose.

Another feature of this invention is the use of conventional bandpass filters and threshold detectors to implement a distortion detection system for a data transmission system.

The above and other objects and features of this invention will be more fully appreciated upon consideration of the following detailed description and the single figure of the drawing which illustrates in block schematic form a portion of a receiver for a vestigial-sideband data transmission system modified to detect square- and cubic-law distortion and the slope of the amplitude-frequency characteristic of the transmission medium and to reject data calls where distortion is excessive.

In the drawing there is shown in block schematic form an illustrative arrangement for monitoring nonlinear distortion in a vestigial-sideband data receiver of the type disclosed in my previously cited copending patent applications. In those applications a high speed serial data train is reconstituted in a multilevel format and amplitude modulated onto a carrier frequency wave within the telephone voice band. Before application to the transmission line the signal is passed through a vestigial-sideband filter for bandwidth conservation purposes. The spectrum of the transmitted signal is advantageously of raised cosine shape. At the band edges pilot tones at frequencies of 675 and 2,475 cycles per second are inserted. Either of the tones is then available to the receiver as an automatic gain control signal. The difference frequency between the tones equals the symbol timing rate of 1,800 cycles per second and further the difference frequency between the higher tone and one-fourth the symbol rate yields the carrier frequency of 2,025 cycles per second.

The complete receiver for such a system includes an automatic gain control amplifier, carrier and symbol rate recovery circuits, an automatic phase control circuit, automatic equalizer and forward-acting error control circuits. Even with all these refinements, designed specifically to cope with linear delay and amplitude distortion only, transmission circuits set up on particular data calls may cause nonlinear distortion beyond the correcting capabilities of these refinements. In this event it would be highly desirable to be able to determine in advance of message transmission the extent of the nonlinear distortion present during a starting sequence, for example, contemplated to establish initial settings of the automatic equalizer and phase control circuits. The purpose of this invention is to provide such monitoring facilities with the minimum of additional equipment.

In the single figure of the drawing a vestigial-sideband signal including band-edge pilot tones as outlined above is received on line 10. After passing through normally closed contacts 11, the received signal is admitted to an automatic gain control circuit comprising an input stage 12, a diode vario-losser 13 and an output stage 14. The output of stage 14 is directed to the remainder (not shown) of the receiver circuitry on lead 20 for data demodulation and to upper and lower pilot-tone bandpass filters 15 and 16. The outputs of narrow-band filters 15 and 16 are delivered on leads 17 and 18 to timing and carrier recovery circuits (not shown) of the receiver. The output of the lower pilot-tone bandpass filter 16 appearing on lead 18 is also brought to a control rectifier 19, whose direct-current output adjusts vario-losser 13 accurately to standardize the level of the received signal. Although the automatic gain control circuit forms no part of this invention, its general arrangement is shown to emphasize that its presence is necessary to insure meaningful results from the distortion detection system of this invention. It will be understood that automatic gain control can also be effected by using the upper pilot-tone frequency.

The remainder of the drawing illustrates this invention. The automatic gain-controlled output of amplifier 14 is directed into three channels. The central channel, including filter 21 and detector 23, separates any energy at the second harmonic of the lower 675 cycle pilot-tone frequency present in the received signal. Detector 23 rectifies this component in a conventional manner to form a direct-current control signal representative of any square-law distortion induced by the transmission network. Filter 21 is narrowly tuned to 1,350 cycles for this purpose. Similarly, cubic-law distortion could be monitored by tuning filter 21 to the third harmonic of either the pilot-tone frequencies. In this instance, however, the right-hand channel, including narrow bandpass filter 22 and detector 24, monitors the difference frequency between that of the upper pilot tone and twice that of the lower pilot tone as a measure of cubic-law distortion present. Bandpass filter 22 is thus tuned to 1,125 cycles per second. This component is rectified in detector 24 to form another control signal.

Both control signals from detectors 23 and 24 are combined in summer 25, which may advantageously be a linear adder. The output of summer 25 is in turn applied to a decision circuit 27, which has established therein a trigger threshold circuit of any available type and produces a significant output when the summed distortion control signals exceed the established threshold. The significant output of circuit 27 operates actuation circuit 34, which in turn controls contact 11 in series with the received signal input. Actuation circuit 34 may comprise an electromagnetic relay. Response of the system is preferably rapid enough to clear the call in sufficient time to prevent charging the originating data subscriber. The originator would make the call and hopefully obtain a rerouting by random selection with less distortion-producing capability.

The central and right-hand channels presumably yield an adequate measure of square- and cubic-law distortion. However, there is another approach to the monitoring problem which may be more appropriate in some instances. The left-hand channel, including filter 30, detector 31, subtractor 32 and reference voltage source 33, is effectively a detector of the slope of the amplitude-frequency characteristic of the transmission system. The lower pilot-tone frequency and the carrier-frequency component have a known ratio as purposely transmitted at the beginning of each call. The received carrier component at 2,025 cycles is separated from the received signal in bandpass filter 30 and detected in detector 31. This resultant control signal is compared in subtractor 32 with a direct-current reference voltage source 33. If the detected carrier component is too low, then the incoming signal can be dropped as before. Reference voltage source 33 has its level adjusted to be equivalent to the appropriate level of the lower pilot-tone frequency. If the distortion monitor were to be limited to slope detection, the output of subtractor 32 could be connected to control actuation circuit 34 directly. On the other hand, all three distortion measures can be logically combined in summer 25 as shown in the drawing. Then when either or all of square-law, cubic-law and slope measures of distortion are out of range, decision circuit 27 can operate actuation circuit 34 and interrupt the call before charging.

It will be understood that the monitoring arrangement of this invention is most advantageously employed during a brief start-up period preceding the transmission of message data. Once the decision has been made to charge the data call, the monitoring apparatus is removed from the circuit. Contact 11 then remains in its normally closed position regardless of the presence or absence thereafter of a carrier-frequency or distortion component.

While this invention has been described by way of a specific illustrative embodiment, the principles thereof are susceptible of extensive modification in various practical circumstances which will readily occur to those skilled in the art. The scope of this invention is to be limited only by the terms of the appended claims.

What is claimed is:

1. In combination with a transmission medium producing nonlinear distortion in traversing signals and a receiver for a data transmission system for line signals having band-edge pilot tones and a controlled carrier-frequency component from which carrier-frequency and data symbol rates can be derived, means for monitoring the presence of nonlinear distortion capable of causing excessive errors in reception comprising means detecting the level of selected harmonics of the pilot-tone and carrier frequencies as a measure of nonlinear distortion in said transmission medium, a decision circuit coupled to said detecting means having a significant output when said distortion measure exceeds a predetermined threshold, and means controlled by the significant output of said decision circuit for rapidly disconnecting said receiver from said transmission medium.

2. The combination set forth in claim 1 in which said detecting means comprises:

a narrow bandpass filter tuned to the second harmonic of one of said pilot-tone frequencies as a measure of the square-law distortion imparted by said transmission medium.

3. The combination set forth in claim 1 in which said detecting means comprises:

a narrow bandpass filter tuned to the second harmonic of the lower of said pilot-tone frequencies as a measure of the square-law distortion imparted by said transmission medium.

4. The combination set forth in claim 1 in which said detecting means comprises:

a narrow bandpass filter tuned to the difference frequency between the upper pilot-tone frequency and the second harmonic of the lower pilot-tone frequency as a measure of the cubic-law distortion imparted by said transmission medium.

5. The combination set forth in claim 1 in which said detecting means comprises:

a narrow bandpass filter tuned to the frequency of said carrier-wave component, means developing a direct-current control signal from the output of said bandpass filter, a reference voltage source serving as a measure of the level of the correctly received lower pilot-tone frequency, and a subtractor having an output equal to the difference between said direct-current control signal and said reference voltage as a measure of the slope of the amplitude-frequency characteristic of said transmission medium.

6. In combination with a transmission medium producing nonlinear distortion in traversing signals and a receiver for a data transmission system utilizing such transmission medium for line signals having band-edge pilot tones from which carrier-frequency and data timing rates can be derived, means for monitoring the presence of nonlinear distortion capable of causing excessive errors in reception comprising:

means separately detecting the second harmonic of the lower pilot-tone frequency and the difference between the upper pilot-tone frequency and the second harmonic of the lower pilot-tone frequency, means adding the outputs of said separate detecting means, a decision circuit producing a distinctive output when the output of said adding means exceeds a predetermined threshold, and actuation means controlled by the distinctive output from said decision circuit for rapidly disconnecting said receiver from said transmission medium.

7. In combination with a transmission medium producing nonlinear distortion in traversing signals and a receiver for data transmission system utilizing such transmission medium for vestigial-sideband line signals having a controlled-level carrier-frequency component and band-edge pilot tones from which the phase of a demodulating carrier wave and data timing rates can be accurately derived, means for monitoring the presence of different types of nonlinear distortion capable of causing excessive errors in reception comprising:

first means detecting the second harmonic of the lower pilot-tone frequency as a measure of square-law distortion present in the received signal, second means detecting the difference between the upper pilot-tone frequency and the second harmonic of the lower pilot-tone frequency as a measure of cubic-law distortion present in the received signal, third means detecting the level of the carrier-frequency component present in the received signal, a reference voltage source serving as a measure of the level of the correctly received lower pilot-tone frequency, a subtractor taking the difference between the output of said third means and said reference voltage as a measure of the slope of the amplitude-frequency characteristic of said transmission medium, a summation circuit linearly combining the outputs of said first and second detecting means with that of said subtractor, a decision circuit coupled to said summation circuit having a significant output when any or all of said distortion measures exceeds a predetermined threshold level, and means controlled by the significant output of said decision circuit for rapidly disconnecting said receiver from said transmission medium.

References Cited

UNITED STATES PATENTS

| | | | |
|---|---|---|---|
| 2,975,231 | 3/1961 | Rhodes | 178—5.4 |
| 3,231,819 | 1/1966 | Aaron | 325—65 |

ROBERT L. GRIFFIN, *Primary Examiner.*

B. V. SAFOUREK, *Assistant Examiner.*

U.S. Cl. X.R.

325—323; 328—162